US008959767B2

(12) United States Patent
Staroselsky et al.

(10) Patent No.: US 8,959,767 B2
(45) Date of Patent: Feb. 24, 2015

(54) METHOD OF EXTENDING LIFE OF ROTATING PARTS

(71) Applicants: United Technologies Corporation, Hartford, CT (US); Georgia Institute of Technology, Atlanta, GA (US)

(72) Inventors: Alexander Staroselsky, Avon, CT (US); Edward F. Pietraszkiewicz, Southington, CT (US); Dominic J. Mongillo, Jr., West Hartford, CT (US); Vincent Barker, Smyrna, GA (US); Benjamin Adair, Atlanta, GA (US); W. Steven Johnson, Roswell, GA (US)

(73) Assignee: United Technologies Corporation, Hartford, CT (US)

( * ) Notice: Subject to any disclaimer, the term of this patent is extended or adjusted under 35 U.S.C. 154(b) by 316 days.

(21) Appl. No.: 13/683,302

(22) Filed: Nov. 21, 2012

(65) Prior Publication Data
US 2014/0137407 A1 May 22, 2014

(51) Int. Cl.
*B23P 6/00* (2006.01)
*B23P 6/04* (2006.01)
*B23P 9/00* (2006.01)

(52) U.S. Cl.
CPC ............... *B23P 6/002* (2013.01); *B23P 6/045* (2013.01); *B23P 9/00* (2013.01); *F05D 2270/11* (2013.01); *F05D 2300/60* (2013.01)
USPC ...................................... 29/889.1; 29/402.19

(58) Field of Classification Search
CPC ............ B23P 6/002; B23P 6/045; B23P 9/00; F01D 5/02; F05D 2270/11; F05D 2300/60
USPC .......... 29/889.1, 402.19; 415/72; 416/201 R, 416/204 R, 244 A
See application file for complete search history.

(56) References Cited

U.S. PATENT DOCUMENTS

| 4,510,679 | A | 4/1985 | Aleem et al. |
| 4,958,431 | A | 9/1990 | Clark et al. |
| 5,846,057 | A * | 12/1998 | Ferrigno et al. ........... 416/241 R |
| 6,027,305 | A | 2/2000 | Ng et al. |
| 6,115,917 | A | 9/2000 | Nolan et al. |
| RE37,562 | E | 2/2002 | Clark et al. |
| 6,494,683 | B1 | 12/2002 | Nolan et al. |
| 6,622,570 | B1 * | 9/2003 | Prevey, III ...................... 73/826 |
| 7,229,253 | B2 * | 6/2007 | Broderick et al. ............ 416/225 |
| 7,744,709 | B2 | 6/2010 | Dierberger |
| 7,819,632 | B2 * | 10/2010 | Hoell et al. ............... 416/244 A |
| 7,955,446 | B2 | 6/2011 | Dierberger |
| 8,051,565 | B2 * | 11/2011 | Luna et al. .................... 29/889.7 |
| 8,454,306 | B2 | 6/2013 | Mokulys et al. |
| 2004/0064945 | A1 | 4/2004 | Howley |

(Continued)

OTHER PUBLICATIONS

International Search Report & Written Opinion for International Application No. PCT/US2013/070949 mailed Mar. 31, 2014.

*Primary Examiner* — Alexander P Taousakis
(74) *Attorney, Agent, or Firm* — Carlson, Gaskey & Olds, P.C.

(57) ABSTRACT

A method of refurbishing a gas turbine engine rotor is disclosed and includes an initial step of inspecting a rotor for defects such as cracks. A strain is then generated around any detected cracks in the rotor to create enhanced plasticized zones about the detected defects that delay defect propagation. Strain is generated by rotating the rotor at speeds greater than operational speeds to induce the desired strain and delay the propagation of defects.

13 Claims, 3 Drawing Sheets

(56) References Cited

U.S. PATENT DOCUMENTS

| | | | |
|---|---|---|---|
| 2005/0158460 A1* | 7/2005 | Williams | 427/140 |
| 2007/0157447 A1* | 7/2007 | Prevey | 29/402.01 |
| 2009/0004364 A1* | 1/2009 | Hollis et al. | 427/9 |
| 2009/0255115 A1* | 10/2009 | Kernozicky et al. | 29/889.1 |
| 2010/0288052 A1 | 11/2010 | Tanaka et al. | |
| 2011/0085913 A1* | 4/2011 | Prevey, III | 416/241 R |
| 2013/0034448 A1* | 2/2013 | Prevey, III | 416/241 R |

\* cited by examiner

METHOD OF EXTENDING LIFE OF ROTATING PARTS

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

Gas turbine engines are removed from service and each part including compressor and turbine rotors are inspected for defects including cracks. Crack propagation rates for specific rotor materials, temperature and loading characteristics limit the life of a rotor. Once parts reach a determined limit, they are scrapped. Compressor and turbine rotors are costly parts and therefore any additional use or extension of life provides substantial value.

SUMMARY

A method of extending operational life of a gas turbine engine rotor according to an exemplary embodiment of this disclosure, among other possible things includes inspecting a rotor for defects, and generating an enhanced compressive residual stress around any defects in the rotor to create plasticized zones about the defects that delay defect propagation.

In a further embodiment of the foregoing method, includes rotating the rotor at a speed above a normal operational speed for generating strain around the defects.

In a further embodiment of any of the foregoing methods, the rotating speed of the rotor greater than about 30% above a normal operating speed.

In a further embodiment of any of the foregoing methods, the rotating speed of the rotor is between about 5% and 45% above a normal operational speed.

In a further embodiment of any of the foregoing methods, the rotating speed of the rotor is between about 25% and 35% above a normal operational speed.

In a further embodiment of any of the foregoing methods, includes rotating the rotor for a time representative of a flight cycle.

In a further embodiment of any of the foregoing methods, includes maintaining the temperature within the range replicating operational temperatures of the rotor during rotation of the rotor.

In a further embodiment of any of the foregoing methods, includes heating the rotor to a temperature within a range between 70° F. and 1250° F.

In a further embodiment of any of the foregoing methods, includes placing blades and/or representations of blades onto the rotor during rotation of the rotor.

In a further embodiment of any of the foregoing methods, the rotor comprises one of a compressor rotor and a turbine rotor.

In a further embodiment of any of the foregoing methods, includes evaluating the defect in view of a predefined criteria and conducting rotor refurbishment when the defects within the rotor meet the criteria.

In a further embodiment of any of the foregoing methods, includes inspecting the rotor after creation of the plasticized zones to confirm that the defects fall within desired operational criteria.

A method of retarding defect growth in a rotor according to an exemplary embodiment of this disclosure, among other possible things includes spinning the rotor at an over-speed between of at least 30% above a normal operational speed, and cycling the rotor between a normal operational speed and the over-speed for a duration of time representative of a flight cycle.

In a further embodiment of the foregoing method, includes generating a plasticized area about a defect with the strain generated by spinning the rotor at the over-speed.

In a further embodiment of any of the foregoing methods, the rotor comprises one of a turbine rotor and a compressor rotor.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
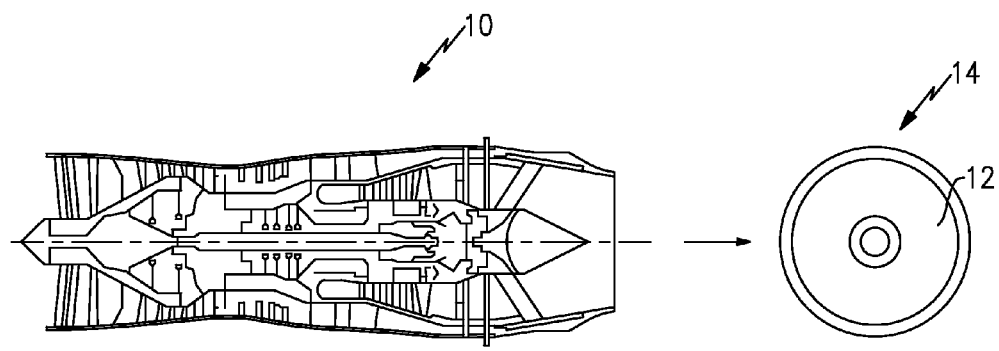
FIG. 1 is a schematic view of a portion of a disclosed method of extending operational life of rotating parts of a gas turbine engine.

Referring to FIG. 1, an example gas turbine engine includes at least one rotor 12. The rotor 12 is periodically removed from the gas turbine engine and inspected according a specific maintenance schedule as is schematically indicated at 14. Once removed, the rotor 12 is inspected for defects such as cracks and micro-cracks. The disclosed example describes the rotor 12 as a turbine rotor 12; however, the disclosed method could be applied to a compressor rotor, or any other rotating component of the gas turbine engine 10.

Figure 2:
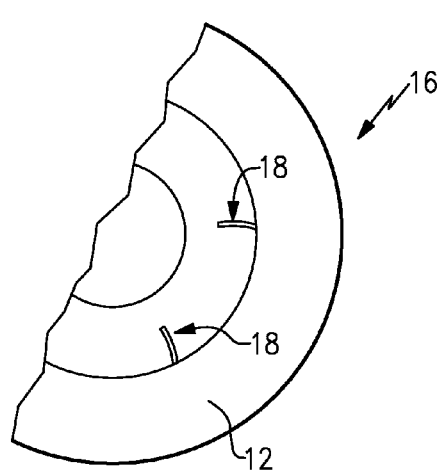
FIG. 2 is a schematic view of an inspection step of the example method.

Referring to FIG. 2 with continued reference to FIG. 1, the inspection process generally indicated at 16 includes the identification of defects such as cracks 18 within the rotor 12. Once the cracks 18 are detected they are measured and a specific crack propagation schedule is utilized to determine the remaining life cycle limit for the inspected rotor 12. The life cycle limit for a rotor 12 that includes cracks 18 is dependent on the rotor materials that the temperature in which it operates along with loading characteristics experienced during operation. Rotor 12 will then be utilized until it reaches that determined life cycle limit. At that life cycle limit the rotor 12 will be removed from the gas turbine engine and scrapped. As appreciated, the scrapping of a rotor is undesirable as rotors are costly, highly engineered components. Accordingly, a disclosed method includes treatment of rotors 12 including cracks 18 detected during scheduled maintenance that extends the cycle life for a specific rotor beyond a cycle life for non-treated rotors.

In this example, the sample rotor 12 is a turbine rotor removed from the turbine section of the gas turbine engine 10. Cracks 18 are detected within a portion of the rotor 12. The cracks illustrated in FIG. 2 are schematically shown and are not indicative of any specific location or length. The identification of the cracks 18 during the inspection process 16 is utilized as a prompt to indicate that treatment should be utilized to extend the useful life of the example rotor 12.

Figure 3:
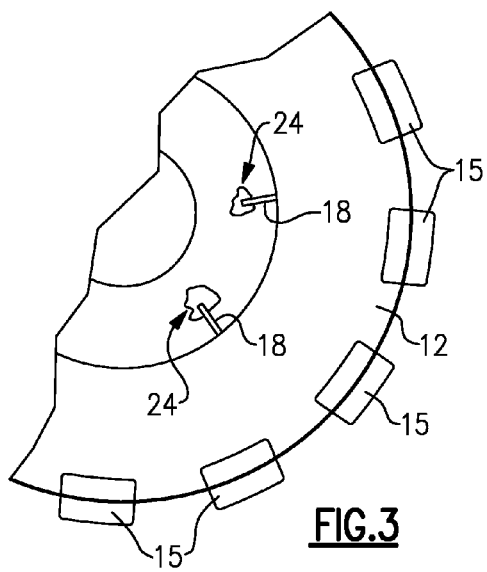
FIG. 3 is a schematic representation of a life extension method.

Referring to FIG. 3 with continued reference to FIG. 2, the example treatment process includes mounting the rotor 12 to a spin machine 22 that is disposed within a controlled environment 20. The rotor 12 is spun as indicated at 36 to introduce beneficiary compressive stresses at a tip of each of the cracks 18.

In this example, the rotor 12 includes blades shown schematically at 15 to induce a further load on the rotor to aid in generation of the beneficial compressive stresses about the crack 18. Moreover, the blades 15 could be replaced with blanks replicating the blades configuration and mass to provide for the desired additional load without the use of actual blades 15. It is also within the contemplation of this disclosure that the rotor 12 could be treated without the blades or representations of the blades 15.

The example method can be performed at room temperature. Moreover in one example disclosed embodiment, the rotor 12 is brought to an elevated temperature for treatment within the controlled environment 20. In one example, the temperature is between 550° F. and 1250° F. As appreciated, heating of the rotor 12 may not be required, but is a step that may be utilized to simulate operational conditions. Furthermore, the temperature at which the rotor 12 is soaked within the controlled environment 20 is dependent on operation parameters and can vary beyond those presented in this disclosure.

Figure 4:
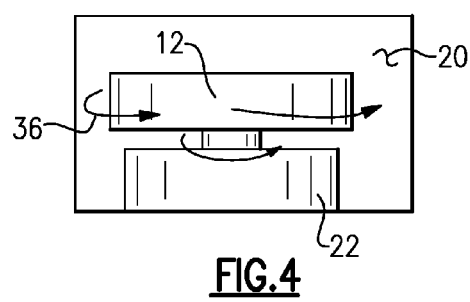
FIG. 4 is a schematic representation of the treatment areas provided by the example method.

Referring to FIG. 4 with continued reference to FIG. 3, the rotor 12 is spun according to a specific cycle schedule to generate beneficiary compressive stress regions around the tips of each of the cracks 18. FIG. 4 illustrates plasticize regions around the cracks 18 that prevent or slow the propagation of those cracks 18 to extend the cycle life of the rotor 12.

Figure 5:
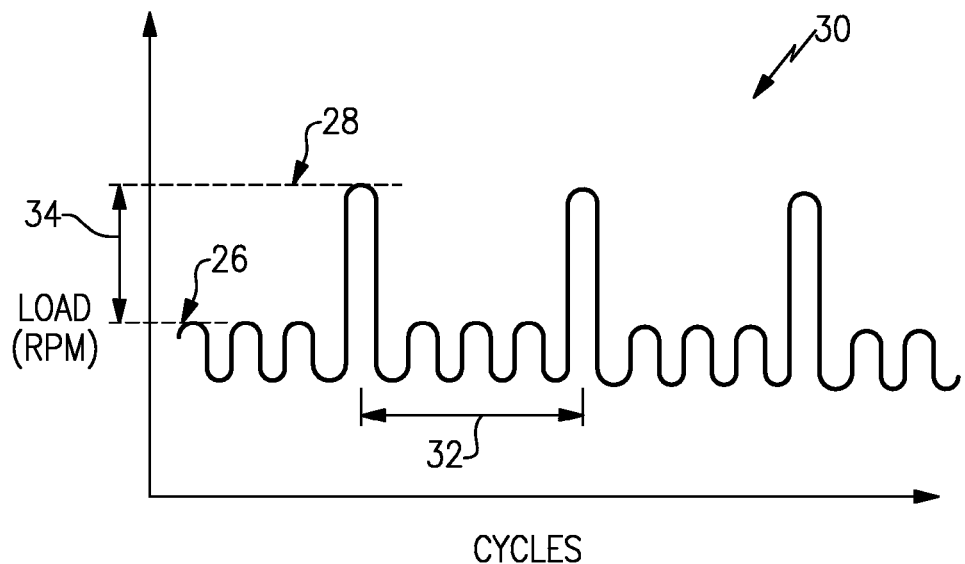
FIG. 5 is a graph illustrating a cyclical loading of a rotor for according to the example method.

Referring to FIG. 5 with continued reference to FIG. 3, the machine 22 spins the rotor 12 according to a cycle schedule generally indicated by graph 30. In this example, the load comprises rotations 36 of the rotor 12 on the machine 22. The rotations are provided at a first normal level 26 for a first span of cycles. The rotor 36 is then sped up to an over speed condition indicated at 28. The over speed condition comes at specific cycle intervals 32.

The over speed condition 28 represents rotations of the rotor 12 above a speed that is normally encountered during operation. In one example disclosed embodiment, the over speed condition 28 represents a speed between about 5% and 45% above the normal operational speed indicated at 26. As appreciated, operational speed of a gas turbine engine can vary during operation. The over speed condition 28 is as compared to a cruise condition of the engine. During operation the rotors of the gas turbine engine will vary in speeds and therefore the cruise condition is utilized as the normal operational speeds to provide a baseline to determine the proper over speed condition 28. However, it should be understood that other baseline speeds could be utilized and are within the contemplation of this disclosure.

In a second disclosed embodiment, the over speed condition 28 comprises a speed between about 25% and 35% greater than the normal rotation speed encountered by the rotor 12. In another disclosed embodiment the speed is at least 30% above normal operational speed of the rotor 12.

The over speed condition 28 is encountered at specific cycle intervals indicated at 32. The cycle intervals 32 are related to operational characteristics and encountered over the life of the rotor. The cycle intervals indicated at 32 are related to a length of time in which the rotor is rotated.

A typical period for operation can vary depending on the type of engine and specific use. In some instance, such as in military uses, the gas turbine engine may normally operate for about 2 hours. Moreover, commercial engines may operate for a longer time such as approximately 5 hours, or even up to 9 hours in some instances. Accordingly, the time at which the rotor is rotated at the over speed condition is selected depending on the specific engine and known use. In one example the rotor is rotated at an interval of between 2 and 5 hours. In another example, the rotor is rotated at an interval of between 7 and 10 hours. It is further within the contemplation of this disclosure that other intervals may be utilized that represent a normal operational period for a particular gas turbine engine.

The method includes mounting of the rotor 12 to the machine 22 within an environment 20 that heats the rotor 12 to a temperature between 550-1250° F. The rotor 12 is then spun at a rotation that simulates operational characteristics and cycles. At specified intervals indicated at 32 on graph 30, the rotor 12 is rotated at a speed greater than the normal operational speed between 25-35% greater than normal operational speed as is indicated by 28. This is repeated over the treatment cycle range to improve and generate the plasticized regions 24 (FIG. 4) around the cracks 18 that slow crack propagation.

Figure 6:
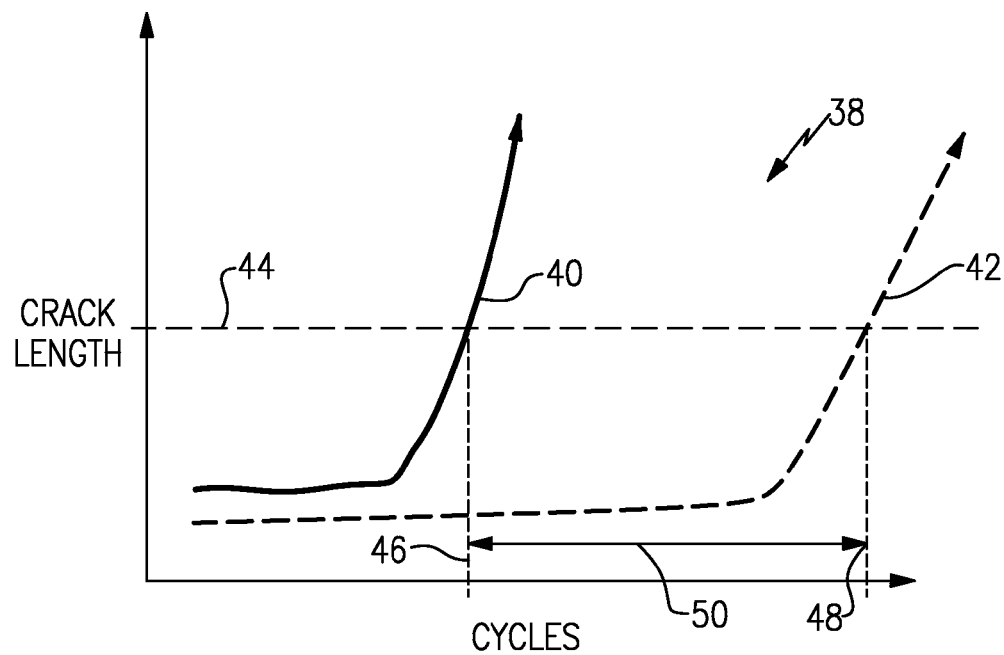
FIG. 6 is a graph illustrating the extension of life provided by the example method.

Referring to FIG. 6, a graph 38 schematically illustrates improvement and cycle length increases indicated at 50 that are provided by the example plasticity enhancement around the detected crack 18. The graph 38 includes a line 40 that is indicative of a normal non-treated rotor where cracks have been detected at 18.

Cracks propagate and reach a limit indicated at 46 after a first number of cycles. The dashed line indicated at 42 represents a treated rotor where the cracks 18 have been over stressed to generate the enhanced plasticized regions 24. The overall operational life of the rotor 12 is thereby increased as indicated at 50 to a new cycle life duration indicated at 48. The new duration 48 is determined by testing of rotors 12 for the specific defect plasticity enhancement schedule. As appreciated, the defect plasticity enhancement schedule including the temperature and load placed on a specific rotor are determined for each rotor material configuration, geometry and specific part number. A new operational life cycle limit is determined that accounts for the enhance plasticity condition with an increase in usable life of the rotor 12 beyond that that would be acceptable for a non-treated rotor. Each of the normal and the extended life cycles limit the cycle of the rotor 12 such that a crack length will not extend beyond an acceptable length indicated by the line 44.

Figure 7:
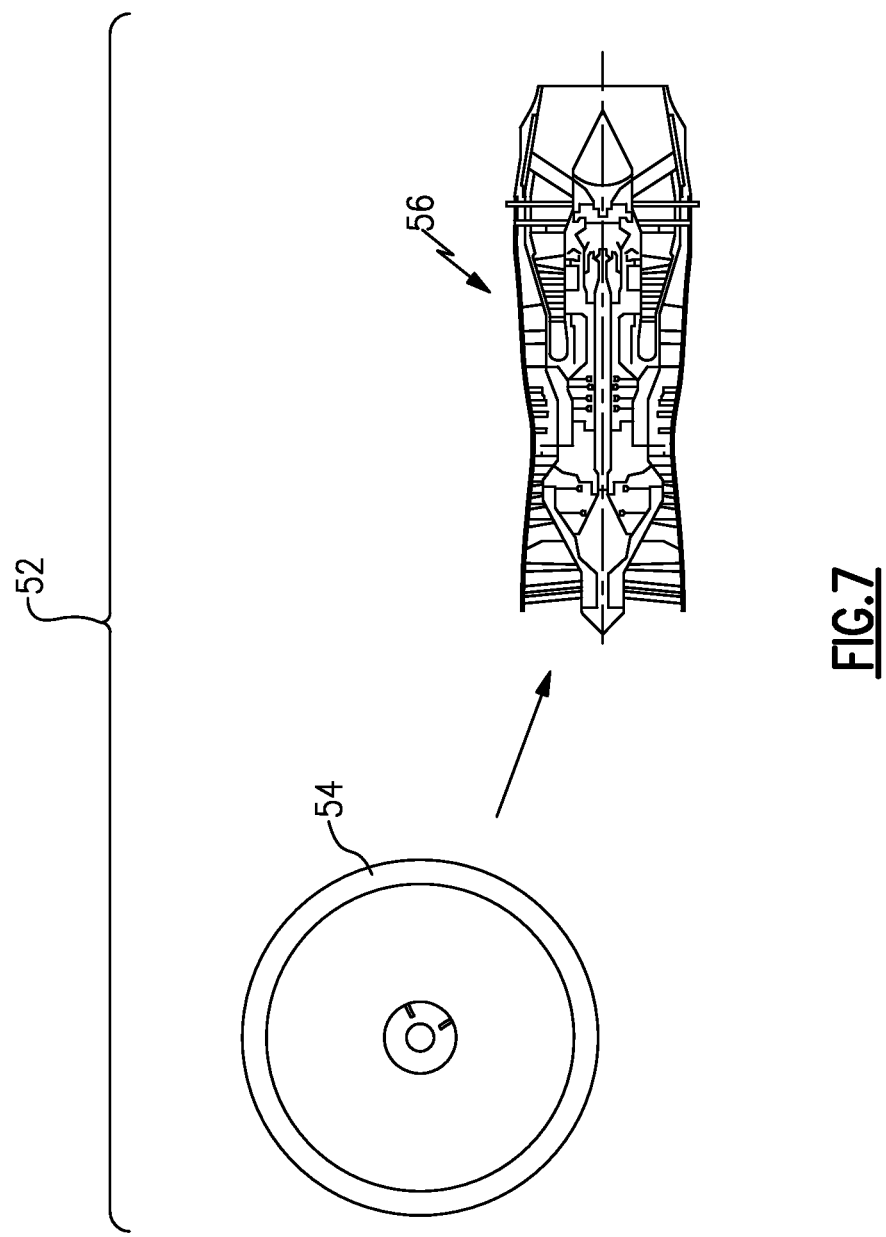
FIG. 7 is schematic view of an example method of utilizing a treated rotor in a short use gas turbine engine.

Referring to FIG. 7, in this disclosed method, treated rotors 54 will have an extended cycle life as is indicated in the graph 38. However, this extended life is still shorter than original parts and are of the refurbished and treated rotors 54. Accordingly, the rotors 54 are installed into gas turbine engines as indicated at 56 for a limited life cycle operation. Such limited operational life cycle gas turbine engines 56 can be utilized for alternate functions and uses such that the rotors 12 can be utilized beyond the original cycle life once a crack is detected within the rotor 12.

Accordingly, the example method provides assistance for treating and over stressing a rotor 12 with defects and/or cracks 18 to elongate the operational cycle life and allow for further use of expensive components.

Although an example embodiment has been disclosed, a worker of ordinary skill in this art would recognize that certain modifications would come within the scope of this disclosure. For that reason, the following claims should be studied to determine the scope and content of this disclosure.

The invention claimed is:

1. A method of extending operational life of a gas turbine engine rotor comprising the steps of:
    inspecting a rotor for defects; and
    generating an enhanced compressive residual stress around any defects in the rotor to create plasticized zones about the defects that delay defect propagation by rotating the rotor at a predetermined temperature at a speed above a normal operational speed for generating the plasticized zones around the defects.

2. The method as recited in claim 1, wherein the rotating speed of the rotor greater than about 30% above a normal operating speed.

3. The method as recited in claim 1, wherein the rotating speed of the rotor is between about 5% and 45% above a normal operational speed.

4. The method as recited in claim 1, wherein the rotating speed of the rotor is between about 25% and 35% above a normal operational speed.

5. The method as recited in claim 1, including rotating the rotor for a time representative of a flight cycle.

6. The method as recited in claim 1, including maintaining the predetermined temperature within the range replicating operational temperatures of the rotor during rotation of the rotor.

7. The method as recited in claim 1, including heating the rotor to a temperature within a range between 70° F. and 1250° F.

8. The method as recited in claim 1, including placing blades and/or representations of blades onto the rotor during rotation of the rotor.

9. The method as recited in claim 1, wherein the rotor comprises one of a compressor rotor and a turbine rotor.

10. The method as recited in claim 1, including evaluating the defect in view of a predefined criteria and conducting rotor refurbishment when the defects within the rotor meet the criteria.

11. The method as recited in claim 1, including inspecting the rotor after creation of the plasticized zones to confirm that the defects fall within desired operational criteria.

12. A method of retarding defect growth in a rotor comprising:
    spinning the rotor at an over-speed between of at least 30% above a normal operational speed;
    cycling the rotor between a normal operational speed and the over-speed for a duration of time representative of a flight cycle; and
    generating a plasticized zones about a defect by spinning the rotor at the over-speed.

13. The method as recited in claim 12, wherein the rotor comprises one of a turbine rotor and a compressor rotor.

* * * * *